(12) United States Patent
Steiner et al.

(10) Patent No.: US 6,273,602 B1
(45) Date of Patent: Aug. 14, 2001

(54) CULINARY WHISK WITH COATED WIRES AND HANDLE

(75) Inventors: Richard P. Steiner, Racine; Robert A. Hilgers, Burlington; Robert J. Albrecht, Racine; Nicholas F. Brust, Union Grove; Victor Stepaniuk, Mukwonago, all of WI (US)

(73) Assignee: Quadra, Inc., Sturtevant, MI (US)

( * ) Notice: Subject to any disclaimer, the term of this patent is extended or adjusted under 35 U.S.C. 154(b) by 0 days.

(21) Appl. No.: 09/755,461

(22) Filed: Jan. 8, 2001

(51) Int. Cl.[7] .................................................... A47J 43/10
(52) U.S. Cl. ................................................................ 366/129
(58) Field of Search ..................................... 366/129, 130, 366/342, 343; 15/141.1, 141.2, 143.1; 99/348; 416/69, 70, 227 R, 231 A

(56) References Cited

U.S. PATENT DOCUMENTS

| | | | |
|---|---|---|---|
| 567,684 | * | 9/1896 | Moody . |
| 837,750 | * | 12/1906 | Sturma . |
| 866,909 | * | 9/1907 | Brenner . |
| 871,247 | * | 11/1907 | Tomlinson . |
| 884,085 | * | 4/1908 | Genge . |
| 1,210,192 | * | 12/1916 | Moses . |
| 1,287,741 | * | 12/1918 | Pinkney . |
| 1,410,522 | * | 3/1922 | Ziemba . |
| 1,468,560 | * | 9/1923 | Diehl . |
| 1,722,187 | * | 7/1929 | Wetzel . |
| 1,910,302 | * | 5/1933 | Maslow . |
| 2,208,337 | * | 7/1940 | Maslow . |
| 2,277,986 | * | 3/1942 | Karp . |
| 2,499,074 | * | 2/1950 | Nordgarden . |
| 3,412,983 | * | 11/1968 | Kesilman et al. . |
| 4,735,510 | | 4/1988 | Barbour ............................ 366/343 |
| 5,465,967 | * | 11/1995 | Boeckenhaupt . |
| 5,688,045 | | 11/1997 | Butte .................................. 366/129 |
| 5,788,368 | | 8/1998 | Anderson .......................... 366/129 |
| 6,026,578 | * | 2/2000 | Brenner . |

FOREIGN PATENT DOCUMENTS

| | | | |
|---|---|---|---|
| 362197 | * | 7/1962 | (CH) . |
| 8704900 | * | 7/1987 | (DE) . |
| 8713911 | * | 1/1988 | (DE) . |
| 216234 | * | 4/1987 | (EP) . |
| 600812 | * | 6/1994 | (EP) . |
| 2646765 | * | 11/1990 | (FR) . |

* cited by examiner

Primary Examiner—Charles E. Cooley
(74) Attorney, Agent, or Firm—Arthur J. Hansmann

(57) ABSTRACT

A culinary whisk and method of making same, including a handle and wires forcibly attached thereto by a frusto-conical insert and a screw extending axially of the handle. The entire whisk is coated with an elastomer, including the wires which have their resilient coating forced radially against a tapered wall forming a cavity in the handle.

18 Claims, 4 Drawing Sheets

CULINARY WHISK WITH COATED WIRES AND HANDLE

This invention relates to a culinary whisk, and more particularly, it relates to the assembly of the whisk handle with the wires forming the whisk members. It involves both the whisk and a method of making the whisk.

BACKGROUND OF THE INVENTION

Culinary whisks already exist in various forms. They are arranged to provide a handle with whisk wires or loops attached for the use in food or culinary preparations. The handle is of a rigid material, and the loops are flexible and are attached to the handle and extend therefrom.

The present invention is concerned with the entire whisk material and assembly, including the attachment of the wires to the handle. It is and object of this invention to improve upon the arrangement of a whisk and its material and the method of making the whisk, including attaching the flexible wires to the rigid handle.

Heretofore, in some instances, the attachment of the wires requires that the wires be specially shaped to accomplish the attachment. In other instances, there is a wire retaining member attached to the handle, but the member is not arranged to securely clamp the wires to the handle.

The present invention improves upon the prior art by providing an assembly of a handle and wires wherein the wires are readily and firmly attached to the handle. Also, the assembly is easily accomplished, and the whisk can even be dissembled to remove the wires for replacement, if and when desired.

Still further, the entire whisk of this invention is coated with an elastomer, such as silicone, to render the whisk resistible to foreign matter and to avoid scratching in the use of the whisk and to render it liquid-proof and easily cleanable.

The whisk of this invention provides for the positioning of the wires for their usual looping and overlapping positioning, and to do so with a structure and method which are an improvement and reliable and simplified.

DETAILED DESCRIPTION OF THE PREFERRED EMBODIMENT AND METHOD

A whisk handle 10 has a plurality of wires 11 attached thereto to extend in the shown loops. The handle 10 is elongated in its shape, and it presents a longitudinal axis 12. The handle 10 has a bulbous shape, as shown, to be ergonomically configured to accommodate a user's gripping hand, and it is generally cylindrical throughout its length along its axis 12.

Figure 4:
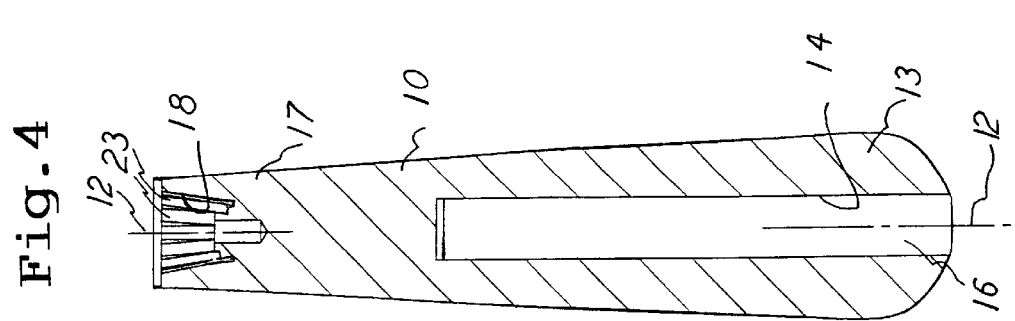
FIG. 4 is a section view taken along the line designated 4—4 in FIG. 3.

FIG. 4 shows that one end 13 of the handle 10 has an opening 14 into which a weight 16 is snugly disposed to give a controllable weighted characteristic to the whisk. The handle end 13 is thusly completely enclosed and devoid of any access into the handle 10.

The handle has another end 17, which is an upper end, and it has a cavity 18 defined by a tapered wall 19. The cavity 18 is initially open to the exterior of the handle 10 and it terminates at a shoulder 21 on the handle 10. The cavity 18 also has a base wall 22 at the interior of the handle 10. The tapered wall 19 is frusto-conical in its shape in the side view, as shown, and it is narrowest toward the interior of the handle 10, that is, at the base 22.

A plurality of equally circumferentially spaced-apart grooves 23 extend along the tapered wall 19 at the tapered orientation as that of the wall 19 and from the shoulder 21 and to their respective bases 24. Every two of the grooves 23 that are diametrically disposed across the cavity 18 form a pair, and the pairs have their every two bases 24 at the same longitudinal extent along the handle 10.

The respective pairs of grooves 23 all extend longitudinally on the handle and along the wall 19 to extents which differ from all other pairs of grooves. Also, all the grooves 23 arcuately extend in substantially a semi-circular cross-section into the wall 19 and at the same arcuate depth. The arcuate depth of each of the grooves 23 is slightly less than the size of the semi-circular cross-section of each wire 11 on the plane transverse to the handle axis 12. The cross-sectional depth of all grooves is the same.

The wires 11 have a circular cross section of uniform size throughout the entire lengths of all wires. The wires all have planar and completely straight ends 26 and 27 where the respective wires are disposed in the respective pairs of grooves 23. Before assembly, the wires are coated throughout their lengths from end to end with an elastomer, such as silicone, and the heretofore mentioned size of the wires includes the silicone coating shown at 35.

Figure 1:
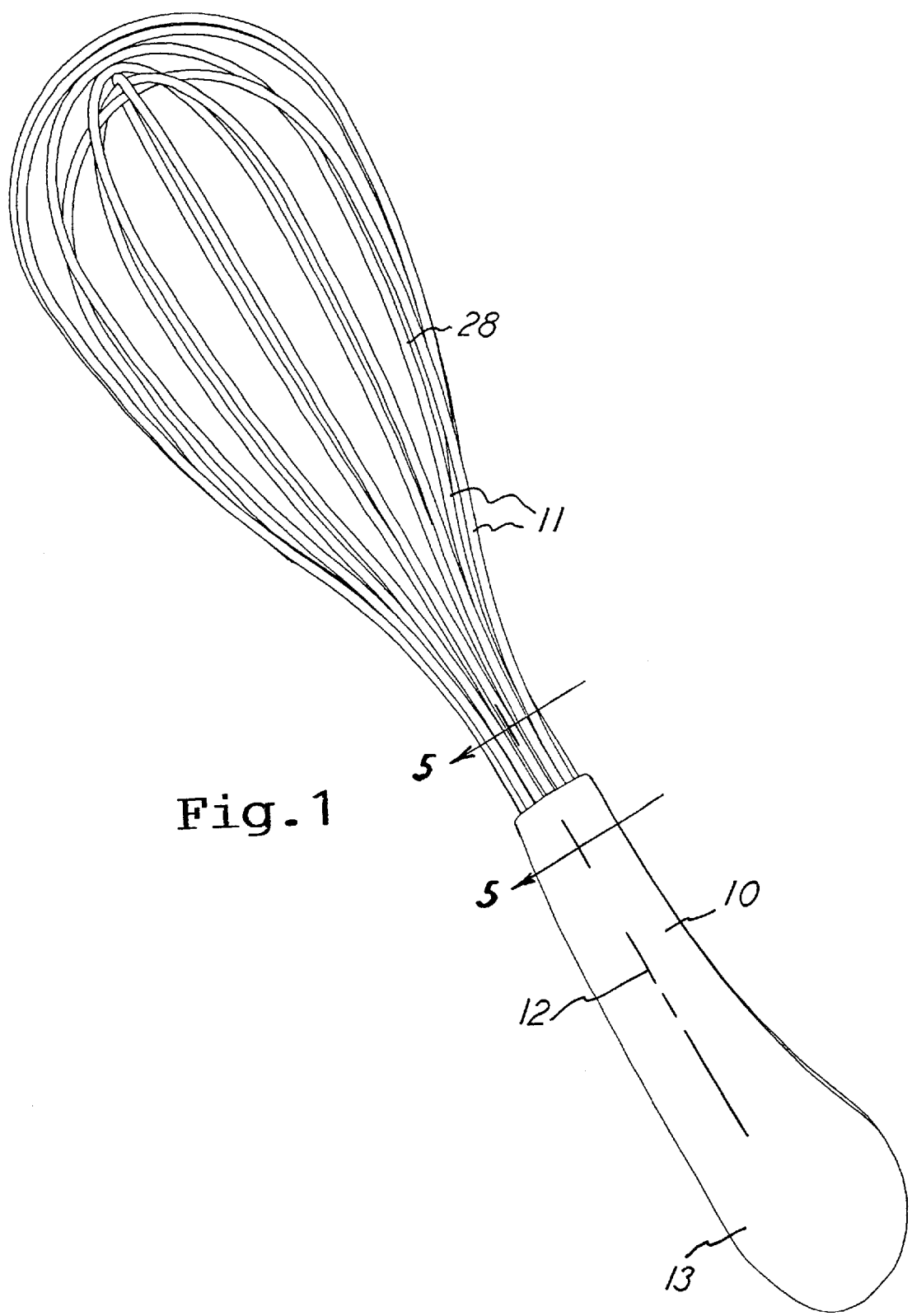
FIG. 1 is a perspective view of a whisk of this invention.
Figure 2:
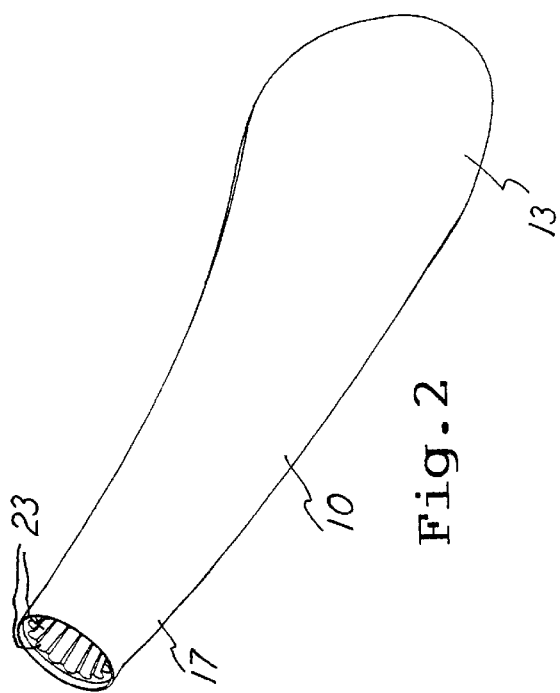
FIG. 2 is a perspective view of the handle shown in FIG. 1, but on a reduced scale.
Figure 3:
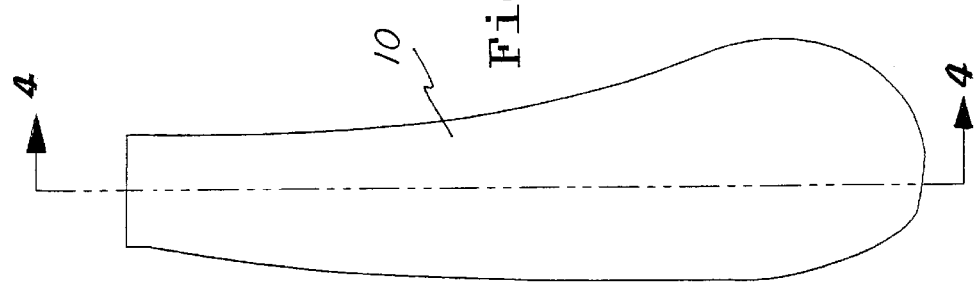
FIG. 3 is a side elevational view of FIG. 2.

FIG. 1 shows the wires 11 extend from the handle 10 in loops 28. The pairs of the depths of the grooves along the handle length are arranged so that the loops overlap each other because of the varying extents of pairs of the grooves and all the wires are of the same overall end-to-end length.

FIG. 5–9 show an insert 29 which is of a frusto-conical shape between parallel end surfaces 31 and 32. The conical shape and size are the same as that of a portion of the length of the cavity 18, and the insert 29 is disposed in the cavity 18 and presents a conical wall 36 disposed at the angulation of the wall 19. The insert 29 has an axial length less than that of the cavity 18, and thus the insert walls 31 and 32 are spaced from the handle cavity walls 21 and 22 in the final assembled condition shown in FIG. 5.

The insert 29 has grooves 34 equally spaced therearound and arranged to match the grooves 23 in length and cross-sectional size. The grooves 34 are arcuate in cross-section, and are formed in the tapered wall 36 on the exterior of the insert 29. Thus, the tapered walls 19 and 36 are parallel to each other. The arcuate depth of the grooves 34 is less than a semi-circular shape and is of the same arcuate shape and depth as that of the grooves 23.

Figure 5:
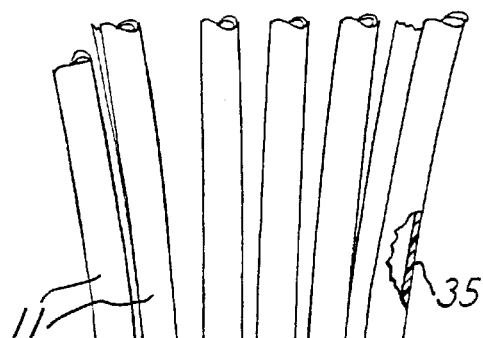
FIG. 5 is a section view taken substantially along the line designated 5—5 in FIG. 1, and on an enlarged scale.

With both grooves 23 and 34 aligned with each other in pairs, each pair receives a respective wire 11, as shown in FIG. 5. The entire lengths of the wires 11 have fully encasing and resilient silicone coatings, as shown at 35. In the final assembly, as shown, the diameter of the wire 11 with its coating 35 is slightly greater than the slightly incomplete diameter formed by each pair of the grooves 23 and 34. FIG. 5 therefore shows that the walls 19 and 36 are spaced apart. The entire insert 29 is completely spaced from the handle 10. That results in the insert 29 radially forcing on the wires 11 to clamp the wires 11 between the handle 10 and the insert 29, with the wires 11 being in the respective pairs of grooves 23 and 34.

However, the insert 29 does not bottom out on the handle base 22, so the insert 29 can be moved axially of the handle to fully force against the silicone elastomer on the wires 11 and thereby firmly hold the wires 11 to the handle 10. That force is in the direction transverse to the handle longitudinal axis 12.

A screw 37 extends through an axial passageway 38 in the insert 29 and threads into an opening 39 in the handle 10. The screw 37 has a head 41 and a shoulder 42 which bears onto a shoulder 43 on the insert 29. A usual screwdriver slot 44 is on the head 41 and it faces to the exterior of the handle, namely, toward the extending wire loops 28. An unshown screwdriver bit, of any conventional form, can be inserted between the wire portions 28 and onto the screw 41 for tightening, and loosening, the screw 41, as desired. The insert 29 is forced axially of the handle 10 and is self-adjusting in exerting equal force on the wire ends, such as ends 26 and 27. The force is substantially radial relative to the handle axis 12, and, by virtue of the application of the screw 37, the insert 29 is forced into the taper 19 of the handle 10.

In making the assembly, the ends of the wires 11 can be placed into the handle grooves 23 and the insert 29 can be passed between the wire portions 28 and placed into the cavity 18 and tightened by the placed screw 41. Alternatively, the insert 29 can be placed into the cavity 18 and the two ends of each of the wires 11 can be inserted into the respective pairs of grooves 23 and 34 and then the screw 41 can be tightened to clamp the wires, all performed with only the upper end 17 of the handle being arranged to present access to the handle interior while the handle lower end 13 can remain fully encased, as mentioned.

Upon completion of that assembly and tightening, the handle has an elastomer coating, such as silicone, including the juncture at 46, to render the assembly liquid proof and to even further support the wires 11 relative to the handle 10, and silicone 47 is shown encasing the handle 10.

In a sequence of assembly events, the handle 10 is molded with its cavity 18 and the weight 16 disposed therein. The handle can be covered with liquid silicone, except, at this time at the cavity 18, by an injection molding process. The handle will be attached to a core for molding, and the core will be suspended in the entire cavity 18 so the silicone can coat the entire remainder of the handle 10. Long lengths of wire, which is of a spring steel which retains its shape once it is bent, have the silicone 35 bonded thereto by first applying a bonding agent and then extruding the silicone 35 around the wire and then curing the silicone. The wire is then cut into pluralities of the one length to present the wires 11. The wires 11 can be bent into the shape they have in the final assembly, as shown. After assembly of the wires 11 with the handle 10, room temperature potting silicone, such as at 46, can be injected around the wires 11 and thereby provide a seal around the wires 11 and with the handle 10 and prevent the accumulation of bacteria at that location.

The silicone 35 on the wires 11 provides for a resilience on the wires in the clamping of the wires by the two tapered members. The grooves 23 and 34 are each less than a semi-circle, so they do not abut each other in the tightening of the insert 29 onto the wires 11, Also, the wire ends are straight and do not require any bending thereon in order to be clamped, and the wires 11 are clamped for the entire length of the insert 29 and thereby provide for stability of the wires 11.

Figure 10:
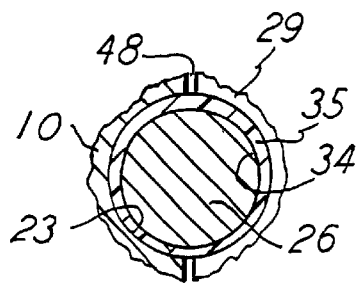
FIG. 10 is an enlarged section view taken along the line designated 10—10 in FIG. 5.

FIG. 10 shows the relationship of the less than semi-circular shape of the grooves 23 and 34, and they are shown compared to the circumference of the coated wire straight end 26. With that arrangement, a gap 48 exits between the tapered walls 19 and 36, so full radial force can be applied onto the wires 11. Also, the insert holes 38 and 49 permit the shank of the screw 37 and screw head 41 to be spaced away from the insert 29 for radial self-positioning of the insert 29, and thereby apply a force only radially relative to the axis 12 as the force is applied to the wires ends 26 and 27 thus assure securement of the coated wires 11.

Figure 11:
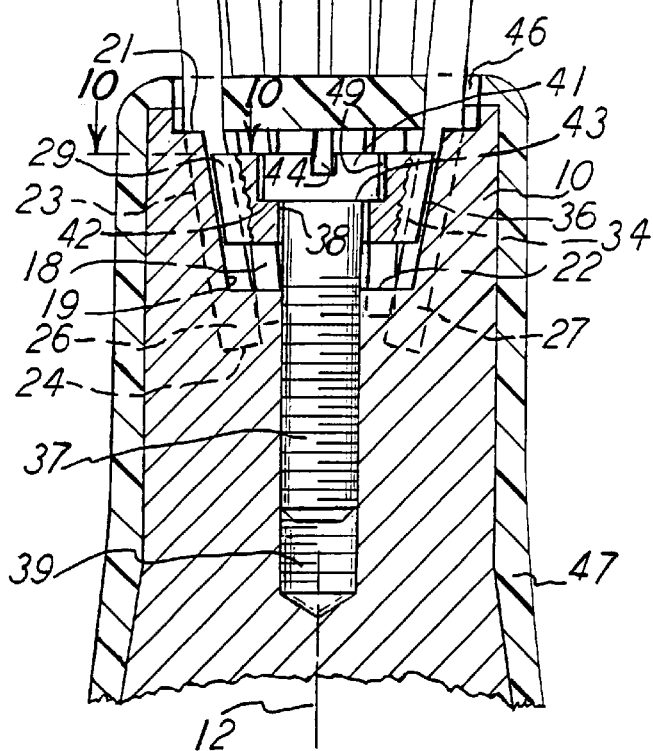
FIG. 11 is similar to FIG. 5, but of another embodiment.
Figure 6:
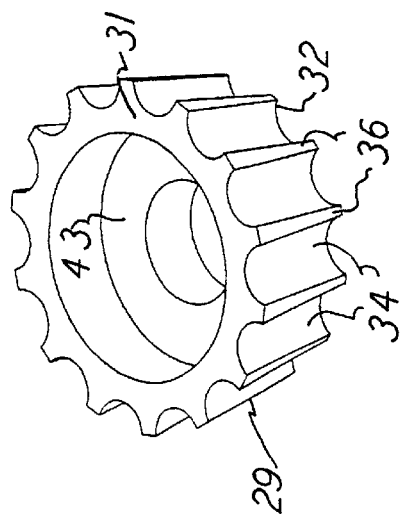
FIG. 6 is a perspective view of a part of the whisk shown in FIG. 5.
Figure 8:
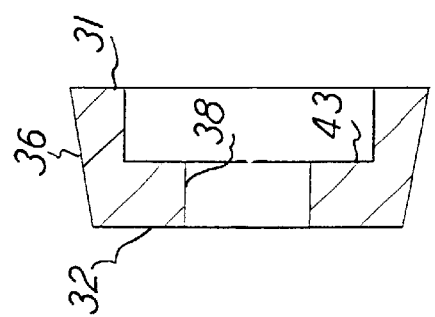
FIGS. 8 and 9 are section views taken respectively along the lines designated 8—8 and 9—9 in FIG. 7.
Figure 9:
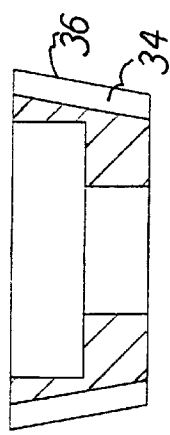
Figure 7:
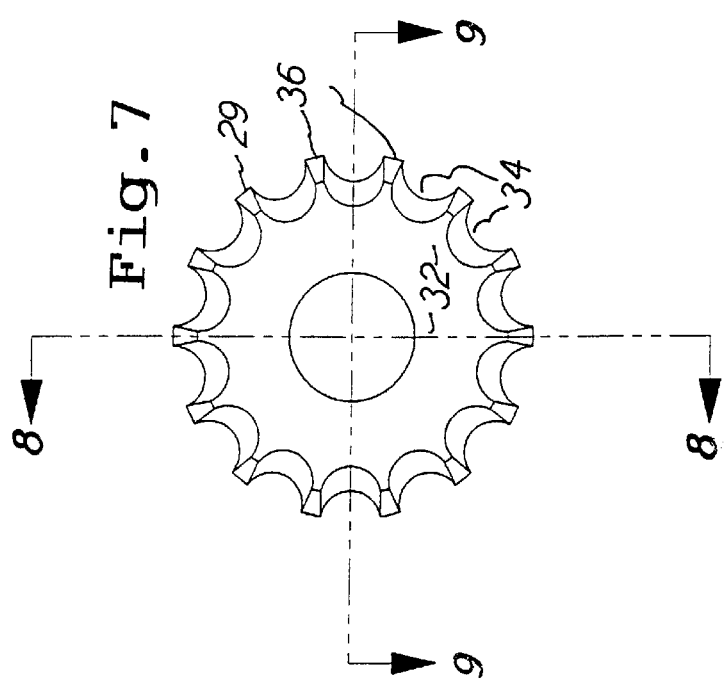
FIG. 7 is a bottom plan view of the part in FIG. 6.

FIG. 11 shows an embodiment wherein the wires 11 are positioned to assure that they extend out of the handle 10 in an alignment parallel to the longitudinal axis 12. Thus, while the angulated grooves 34 are utilized for clamping the wires to the handle, with each groove 34 there is another groove 51, positioned as and external end to each respective groove 34 and extending parallel to the axis 12. In that arrangement, the grooves 34 and the grooves or external ends 51 form one continuous groove for positioning the respective wires 11 and thereby assure that the wires 11 exit the handle in the orientation parallel to the axis 12 and that the wires 11 maintain that straight orientation when in use. While that orientation is shown in FIGS. 1 and 5, it is assured by the grooves 51 which abut the wires 11 which are adjacent to the grooves 51. There is, therefore, the provision of one continuous groove provided by the two grooves 34 and 51, and with those two grooves 34 and 51 being angulated to each other in their respective extents. In FIG. 11, the insert 29 is still in the position shown in FIG. 5 and is thusly spaced from the grooves 51 and the two are therefore not positioned on one common transverse plane across the handle 10.

What is claimed is:

1. A culinary whisk comprising:

a handle having a longitudinal axis and a taper-shaped cavity extending concentrically relative to said axis and into an end of said handle and being tapered inwardly in its extent into said handle and presenting a tapered wall defining said cavity, a plurality of elongated wires having terminal ends extending only straight along the lengths of said wires and having an elastomer coating encasing said terminal ends and with said terminal ends terminating in a straight length disposed only parallel to said tapered wall and being disposed in said taper-shaped cavity, an abutment member disposed in said taper-shaped cavity and having a taper-shaped outer wall with a taper parallel to said handle tapered wall and with said outer wall being in contact with said coating along said straight length of said wire terminal ends and in a direction transverse to said axis, and a fastener engaged between said abutment member and said handle and being arranged to urge said abutment member axially of said handle to where said abutment member taper-shaped outer wall is pressed against said coating on said wire terminal ends in a direction transverse to said axis and thereby compress said coating and clinch said wire terminal ends against both said taper-shaped walls and thereby secure said wires in respective fixed positions with said handle.

2. The culinary whisk as claimed in claim 1, wherein: said cavity and said abutment member tapered shapes are frusto-conical shapes of the same tapered angulation relative to said axis.

3. The culinary whisk as claimed in claim 1, wherein: said abutment member is free of any contact with said handle and presents a tapered annular space between said abutment member and said handle and with said space completely surrounding said abutment member, and said wire terminal ends being disposed only in said space and in contact with both said abutment member wall and said handle tapered wall and compressed therebetween and with said abutment member being forced along said axis by said fastener for compressing said wires.

4. The culinary whisk as claimed in claim 1, wherein:

a selected one of the two said tapered walls of said abutment member and said handle has a plurality grooves spaced apart and extending in a direction only generally parallel to said axis and with said grooves respectively separately receiving said terminal ends with said coating.

5. The culinary whisk as claimed in claim 4, wherein:

both said tapered walls have said grooves thereon with each one of said grooves being semi-circular in cross-sectional shape for respectively receiving a half of a total of the cross-sectional shape of a respective one of said coated terminal ends.

6. The culinary whisk as claimed in claim 1, wherein:

said handle is arranged with stops spaced adjacent said handle tapered wall and around said axis and at respective various distances defined by planes transverse to and spaced along said axis and with the straight said wire terminal ends being disposed in respective contact with said stops and having said wires project from said handle parallel to said axis to respective various positions.

7. The culinary whisk as claimed in claim 1, including:

said cavity having a base located in said end of said handle, said handle having a threaded hole aligned with said axis and extending through said base and into said handle and terminating in a blind hole within said handle, and said fastener is a threaded screw threaded into said hole and including a screw head disposed to be screwdriver accessible at said handle end by a screwdriver extending into the midst of and past said wires.

8. A method of making a culinary whisk by securing a plurality of coated wires to a handle, comprising the steps of:

forming a handle with an axis and with a tapered wall presenting a cavity in one end thereof and concentric to said axis and with a threaded opening extending from said cavity and terminating within said handle, placing a frusto-conical insert into said cavity to be in contact with said wires, coating a plurality of said wires completely throughout their lengths with an elastomer coating, placing coated end lengths of said coated wires into said cavity and only along said tapered wall and having said wires extend from said handle, applying a screw through said insert and into said handle threaded opening and along said axis to hold said insert on said handle and against said coated wires, and presenting a head with a slot on said screw in a position to be accessible by a screwdriver projecting past said wires and into said cavity, and tightening said screw and compressing said coating for clamping said wires against said tapered wall and thereby into clamped securement between said handle and said insert upon tightening said screw in said threaded opening.

9. The method of making a culinary whisk as claimed in claim 8, wherein the steps of:

said placing of said frusto-conical insert and said applying of said screw are arranged to have said insert completely spaced from said handle to thereby force said elastomered ends of said wires only against said handle tapered wall.

10. A culinary whisk comprising:

an elongated handle having an axis and a length and two oppositely disposed end lengths on said axis and with a first one of said end lengths having a tapered wall concentric with said axis and defining a cavity and having a threaded blind hole terminating completely within said first one of said end lengths of said handle and a second one of said end lengths including a weight embedded therein and being completely enclosed by said handle, a tapered insert disposed in said cavity and having an exterior wall radially disposed relative to said axis and at a taper angle extending parallel to said handle tapered wall to thereby match said handle tapered wall and with said insert being completely spaced from said handle, a plurality of whisk wires having terminal ends disposed in the radial space between said insert and said handle and with said wires extending from said handle, and a screw disposed in said cavity and said threaded hole and being threadedly connected between said insert and said first end length of said handle for securing said insert with said handle and thereby urging said insert toward said handle and thereby clamping said wires in the radial space between said insert and said handle and only onto said tapered walls.

11. The culinary whisk as claimed in claim 10, including:

said terminal ends of said wires having an elastomer coating thereon to thereby present resiliency in the contact of said wires with said tapered walls to thereby assure the clamping of said wires.

12. The culinary whisk as claimed in claim 11, including:

an elastomer coating completely encasing said handle and any juncture between said wires and said handle.

13. The culinary whisk as claimed in claim 10, wherein:

said screw has a screwdriver receptive head faced toward said wires to be accessible by passage of a screwdriver bit past said wires and onto said head.

14. The culinary whisk as claimed in claim 10, including:

a plurality of grooves on both said walls and with each of said grooves being semi-circular in cross-section and with one of said grooves from both said walls forming pairs of said grooves for surrounding said elastomer coated wires in the clamping thereof.

15. The culinary whisk as claimed in claim 10, wherein:

said insert is spaced from said screw in all directions radial from said axis to thereby be radially self-positioning and arranged to exert radially directed uniform forces onto said wires.

16. A culinary whisk comprising:

an elongated handle having an axis and a tapered wall concentric with said axis and defining a cavity, a tapered insert disposed in said cavity and having an exterior wall radially disposed relative to said axis and at a taper angle extending parallel to said handle tapered wall to thereby match said handle tapered wall and with said insert being completely spaced from said handle, a plurality of whisk wires disposed in the radial space between said insert and said handle and with said wires extending from said handle, said handle having a plurality of grooves extending in the longitudinal plane of said axis and being spaced around and at the angulation of said handle tapered wall and having an end adjacent the exterior of said handle and respectively snugly receiving said wires for the clamping of said wires, an additional groove on said handle at said end of each of said angulated grooves and being disposed parallel to said axis and supporting said wires in an orientation parallel to said axis, and a screw disposed in said cavity and being threadedly connected between said insert and said handle for securing said insert with said handle and thereby urging said insert toward said handle and thereby clamping said wires in the radial space between said inset and said handle and only onto said tapered walls.

17. The culinary whisk as claimed in claim 16, including:

a weight embedded in said handle at an end thereof opposite from said cavity and being completely enclosed by said handle for giving a weighted characteristic to said whisk.

18. A culinary whisk comprising:

a handle having a longitudinal axis and a taper-shaped cavity extending concentrically relative to said axis and into an end of said handle and being tapered inwardly in its extent into said handle and presenting a tapered wall defining said cavity and said handle having a threaded hole extending from said cavity and along said axis and terminating within said handle as a blind hole within said handle, a plurality of elongated wires having terminal ends extending only straight along the lengths of said wires and terminating in a straight length disposed only parallel to said tapered wall and being disposed in said taper-shaped cavity and with said wires extending outwardly from said cavity in loop formation, an abutment member disposed in said taper-shaped cavity and having a taper-shaped outer wall with a taper parallel to said handle tapered wall and with said outer wall being in contact with said wire terminal ends only in a direction transverse to said axis and said abutment member having a hole therethrough along said axis, and a screw in said threaded hole and having a head engaged with said abutment member and having a screw slot facing toward said loop formation of said wires and being completely disposed within said threaded hole and said cavity and free of any extent beyond said threaded hole and said cavity and being threadedly movable axially of said handle for urging said abutment member axially of said handle to where said abutment member taper-shaped outer wall is pressed against said wire terminal ends only in the direction transverse to said axis and thereby clinch said wire terminal ends against both said taper-shaped walls and thereby secure said wires in respective fixed positions with said handle.

\* \* \* \* \*